United States Patent
Kura et al.

(10) Patent No.: US 12,505,732 B2
(45) Date of Patent: Dec. 23, 2025

(54) DISASTER INFORMATION PROVISION DEVICE, DISASTER INFORMATION PROVISION SYSTEM, DISASTER INFORMATION PROVISION METHOD, AND DISASTER INFORMATION PROVISION PROGRAM

(71) Applicant: NTT, Inc., Tokyo (JP)

(72) Inventors: Tsuneko Kura, Musashino (JP); Naoko Kosaka, Musashino (JP); Akira Koyama, Musashino (JP); Hiroshi Matsubara, Musashino (JP); Jun Kato, Musashino (JP)

(73) Assignee: NTT, Inc., Tokyo (JP)

( * ) Notice: Subject to any disclaimer, the term of this patent is extended or adjusted under 35 U.S.C. 154(b) by 189 days.

(21) Appl. No.: 18/565,182

(22) PCT Filed: Jun. 4, 2021

(86) PCT No.: PCT/JP2021/021389
§ 371 (c)(1),
(2) Date: Nov. 29, 2023

(87) PCT Pub. No.: WO2022/254697
PCT Pub. Date: Dec. 8, 2022

(65) Prior Publication Data
US 2024/0265800 A1   Aug. 8, 2024

(51) Int. Cl.
*G08B 31/00* (2006.01)

(52) U.S. Cl.
CPC .................................. *G08B 31/00* (2013.01)

(58) Field of Classification Search
CPC ......... G08B 21/10; Y02A 10/40; H04W 4/90; G16Y 20/10
See application file for complete search history.

(56) References Cited

U.S. PATENT DOCUMENTS

| | | | |
|---|---|---|---|
| 2007/0033153 A1* | 2/2007 | Yamanaka | G01V 1/01 706/21 |
| 2015/0264547 A1* | 9/2015 | Kobayashi | G08B 21/10 455/404.2 |
| 2018/0136085 A1* | 5/2018 | Lochry | G01M 5/0091 |

(Continued)

FOREIGN PATENT DOCUMENTS

| | | |
|---|---|---|
| JP | 201810337 | 1/2018 |
| JP | 20198643 | 1/2019 |

(Continued)

*Primary Examiner* — Mirza F Alam
(74) *Attorney, Agent, or Firm* — Fish & Richardson P.C.

(57) ABSTRACT

A past disaster information storage section (28) that stores disaster information related to a disaster that has occurred in the past and a disaster information acquisition section (32) that acquires current disaster information related to a disaster that has occurred this time are included. A disaster prediction section (35) that predicts future disaster information caused by a disaster that has occurred this time on the basis of current disaster information acquired by the disaster information acquisition section (32) and past disaster information stored in the past disaster information storage section (28), and a display control section (37) that displays an image in which the current disaster information and the future disaster information are superimposed are further included.

9 Claims, 13 Drawing Sheets

(56) References Cited

U.S. PATENT DOCUMENTS

2018/0218547 A1* 8/2018 Kalyanaraman ..... G07C 5/0825
2021/0256444 A1   8/2021 Koyama et al.
2023/0401956 A1* 12/2023 Nishimoto ........... G08G 1/0967

FOREIGN PATENT DOCUMENTS

| JP | 2019215623 | 12/2019 |
| JP | 2020113333 A | 7/2020 |
| JP | 202156574 | 4/2021 |
| WO | WO 2017081772 | 5/2017 |

* cited by examiner

Fig. 5

| | PEOPLE IN SHELTERS |
| | PEOPLE AT HOME |
| | LIGHTLY INJURED PEOPLE |
| | SERIOUSLY INJURED PEOPLE |
| | MISSING PEOPLE |
| | DEAD PEOPLE |

Fig. 6A

|  | AVAILABLE | OPERATING |
|---|---|---|
| WATER SUPPLY VEHICLE (● t) | 5 | 1 |
| WATER SUPPLY VEHICLE (□ t) | 3 | 0 |
| POWER SUPPLY VEHICLE (A TY...) | | |

|  | ACCEPTED NUMBER | ACCEPTABLE NUMBER | PREDICTED NUMBER AFTER TWO DAYS |
|---|---|---|---|
| EVACUEES | 38 | 172 | 180 |

|  | REQUIRED NUMBER | STOCKPILES | PREDICTED NUMBER AFTER TWO DAYS |
|---|---|---|---|
| NUMBER OF TENTS | 13 | 87 | 80 |
| DRINKING WATER | 152 | 1848 | 720 |
| EVACUATION FOOD | 114 | 186 | 540 |

Fig. 6B

| | AVAILABLE | OPERATING |
|---|---|---|
| WATER SUPPLY VEHICLE (● t) | 2 | 4 |
| WATER SUPPLY VEHICLE (□ t) | 0 | 3 |
| POWER SUPPLY VEHICLE (A TYPE) | | |

| | ACCEPTED NUMBER | ACCEPTABLE NUMBER | PREDICTED NUMBER AFTER TWO DAYS |
|---|---|---|---|
| EVACUEES | 64 | 136 | 180 |

| | REQUIRED NUMBER | STOCKPILES | PREDICTED NUMBER AFTER TWO DAYS |
|---|---|---|---|
| NUMBER OF TENTS | 23 | 77 | 80 |
| DRINKING WATER | 256 | 1744 | 720 |
| EVACUATION FOOD | 192 | 308 | 540 |

Fig. 6C

|  | AVAILABLE | OPERATING |
|---|---|---|
| WATER SUPPLY VEHICLE (● t) | 1 | 5 |
| WATER SUPPLY VEHICLE (□ t) | 1 | |
| POWER SUPPLY VEHICLE (A TYPE) | 12 | |

|  | ACCEPTED NUMBER | ACCEPTABLE NUMBER | PREDICTED NUMBER AFTER TWO DAYS |
|---|---|---|---|
| EVACUEES | 64 | 136 | 180 |
|  | REQUIRED NUMBER | STOCKPILES | PREDICTED NUMBER AFTER TWO DAYS |
| NUMBER OF TENTS | 23 | 77 | 80 |
| DRINKING WATER | 256 | 1744 | 720 |
| EVACUATION FOOD | 192 | 108 | 540 |

DISASTER INFORMATION PROVISION DEVICE, DISASTER INFORMATION PROVISION SYSTEM, DISASTER INFORMATION PROVISION METHOD, AND DISASTER INFORMATION PROVISION PROGRAM

CROSS-REFERENCE TO RELATED APPLICATIONS

This application is a National Stage application under 35 U.S.C. § 371 of International Application No. PCT/JP2021/021389, having an International Filing Date of Jun. 4, 2021. The disclosure of the prior application is considered part of the disclosure of this application, and is incorporated by reference in its entirety into this application.

TECHNICAL FIELD

The present invention relates to a disaster information providing device, a disaster information providing system, a disaster information providing method, and a disaster information providing program.

BACKGROUND ART

When a disaster such as flooding of a river due to a typhoon or collapse of a house due to a large earthquake occurs, promptly notifying residents in the area of damage information, supply information, evacuation spot information, and the like is necessary.

Patent Literature 1 discloses that a disaster-stricken site is identified on the basis of failure information of communication lines. Patent Literature 2 discloses that failure information and recovery information related to infrastructures are mapped on a map and notification of damage information is given.

CITATION LIST

Patent Literature

Patent Literature 1: JP 2019-008643 A
Patent Literature 2: JP 2019-215623 A

SUMMARY OF INVENTION

Technical Problem

However, in the technologies disclosed in Patent Literature 1 and 2, only notification of disaster information currently occurring is given, and there is no mention of predicting and giving notification of disaster information that changes thereafter. Therefore, there is an issue that advancing evacuation plans for residents and recovery plans for disaster-stricken infrastructures after predicting a damage situation after occurrence of a disaster is difficult.

The present invention has been made in view of the above circumstances, and an object of the present invention is to provide a disaster information providing device, a disaster information providing system, a disaster information providing method, and a disaster information providing program capable of predicting future disaster information after occurrence of a disaster and notifying residents.

Solution to Problem

A disaster information providing device according to an aspect of the present invention includes a past disaster information storage section that stores disaster information related to a disaster that has occurred in a past, a disaster information acquisition section that acquires current disaster information related to a disaster that has occurred this time, a disaster prediction section that predicts future disaster information caused by a disaster that has occurred this time on the basis of current disaster information acquired by the disaster information acquisition section and past disaster information stored in the past disaster information storage section, and a display control section that displays an image in which the current disaster information and the future disaster information are superimposed.

A disaster information providing system according to an aspect of the present invention includes a disaster information providing device, and a client terminal connected to the disaster information providing device via a network, in which the disaster information providing device includes a past disaster information storage section that stores disaster information related to a disaster that has occurred in a past, a disaster information acquisition section that acquires current disaster information related to a disaster that has occurred this time from the client terminal, a disaster prediction section that predicts future disaster information caused by a disaster that has occurred this time on the basis of current disaster information acquired by the disaster information acquisition section and past disaster information stored in the past disaster information storage section, and a display control section that displays an image in which the current disaster information and the future disaster information are superimposed.

A disaster information providing method according to an aspect of the present invention includes a step of acquiring disaster information related to a disaster that has occurred in a past from a past disaster information storage section, a step of acquiring current disaster information related to a disaster that has occurred this time, a step of predicting future disaster information caused by a disaster that has occurred this time on the basis of current disaster information that has occurred the this time and past disaster information that has occurred in the past, and a step of displaying an image in which the current disaster information and the future disaster information are superimposed.

An aspect of the present invention is a disaster information providing program causing a computer to function as the disaster information providing device described above.

Advantageous Effects of Invention

According to the present invention, future disaster information after occurrence of a disaster can be predicted and residents can be notified of the predicted future disaster information.

BRIEF DESCRIPTION OF DRAWINGS

FIG. 5 is an explanatory diagram illustrating a breakdown of bar graphs illustrated in FIGS. 4A to 4C.

FIG. 6A is an explanatory diagram illustrating resource information at the time T−Δt.

FIG. 6B is an explanatory diagram illustrating resource information at the time T.

FIG. 6C is an explanatory diagram illustrating resource information at the time T+Δt.

DESCRIPTION OF EMBODIMENTS

Configuration of Embodiment

Figure 1:
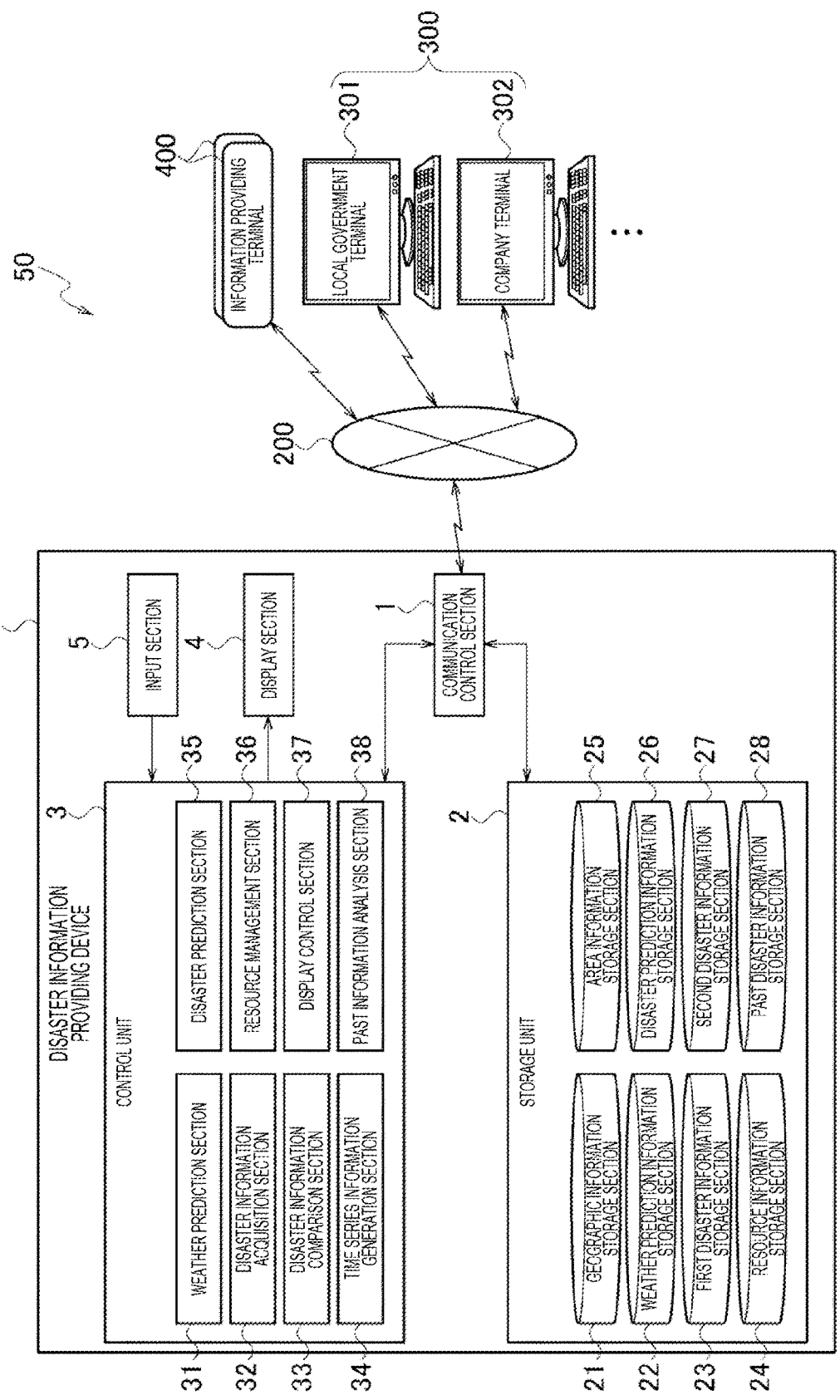
FIG. 1 is a block diagram illustrating a configuration of a disaster information providing system according to an embodiment.

Hereinafter, an embodiment will be described with reference to the drawings. FIG. 1 is a block diagram illustrating a configuration of a disaster information providing system 50 including a disaster information providing device 100 according to the present embodiment. Note that the "disaster information" described in the present embodiment includes damage information indicating a situation of damage due to a disaster, resource information indicating supply amounts and shortage amounts of supplies, evacuation related information, and recovery information of damage.

The damage information includes information related to infrastructures including gas, water supply, and electricity, in addition to an inundated area, collapse of a building such as a house, a store, a factory, and a warehouse, and cutting of a road and a bridge.

The resource information includes information related to food, drinking water, blankets, daily necessities, and vehicles for transportation of supplies to be supplied to disaster-stricken people and shelters, and information related to supply amounts and shortage amounts thereof. Furthermore, the resource information also includes inventory information of facilities capable of procuring food, such as supermarkets and convenience stores.

The evacuation related information includes information related to the number of disaster-stricken people, locations of shelters, the number of people accommodated and the number of people who can be accommodated in the shelters, locations of hospitals, congestion degrees of the hospitals, and transportation facilities such as trains and buses. The recovery information includes information related to recovery statuses of transportation facilities, roads, and bridges, and periods required for the recovery.

As illustrated in FIG. 1, a disaster information providing system 50 according to the present embodiment includes a disaster information providing device 100, a network 200, a plurality of client terminals 300, and information providing terminals 400.

The client terminals 300 include a local government terminal 301 owned by each local government and a company terminal 302 owned by each company or organization.

The local government terminal 301 provides disaster information controlled by the local government, such as evacuation related information, resource information, and recovery information.

The company terminal 302 provides disaster information controlled by a company or an organization, such as damage information and resource information.

The information providing terminals 400 each provide geographic information and area information of each area. The geographic information includes information related to topography such as a city planning base map, a topographic map, a road ledger map, a river base map, and a tomographic map. The area information includes population on Basic Resident Register and building information of the area.

The disaster information providing device 100 includes a communication control section 1, a storage unit 2, a control unit 3, a display section 4, and an input section 5.

The communication control section 1 is connected to each of the client terminals 300 and the information providing terminals 400 via the network 200. The communication control section 1 communicates with each of the client terminals 300 and each of the information providing terminals 400 via the network 200.

The display section 4 is, for example, a liquid crystal display, and displays image data output from the control unit 3 on a screen.

The input section 5 is, for example, a keyboard or a mouse, and receives an external input and various input operations by a user. Note that a touch panel sensor as both the display section 4 and the input section 5 may be used.

The storage unit 2 includes a geographic information storage section 21, a weather prediction information storage section 22, a first disaster information storage section 23, a resource information storage section 24, an area information storage section 25, a disaster prediction information storage section 26, a second disaster information storage section 27, and a past disaster information storage section 28.

The geographic information storage section 21 stores information related to topography such as a city planning map, a topographic map, a road ledger map, and a river base map, a tomographic map provided from the information providing terminals 400 of external organizations, for example.

The weather prediction information storage section 22 stores weather prediction information predicted by a weather prediction section 31 to be described below.

The first disaster information storage section 23 stores disaster information provided from the local government terminal 301 at the time of disaster occurrence. The disaster information includes evacuation related information and recovery information.

The resource information storage section 24 stores resource information provided from the local government terminal 301 and the company terminal 302 at the time of disaster occurrence.

The area information storage section 25 stores information related to a specific area, such as population on Basic Resident Register and building information provided from the information providing terminals 400.

The disaster prediction information storage section 26 stores future disaster information predicted by a disaster prediction section 35 to be described below. The second disaster information storage section 27 stores disaster information provided from the company terminal 302 at the time of disaster occurrence. The disaster information provided from the company terminal 302 includes damage information.

The past disaster information storage section 28 stores disaster information related to a disaster that has occurred in the past. For example, past disaster information including time series information such as precipitation of ∘∘ mm in the past disaster, flooding of oo river, and evacuation of ∘∘ disaster-stricken people to oo shelter is stored.

The control unit 3 includes the weather prediction section 31, a disaster information acquisition section 32, a disaster information comparison section 33, a time series information generation section 34, the disaster prediction section 35, a resource management section 36, a display control section 37, and a past information analysis section 38.

The weather prediction section 31 acquires various types of weather information including a precipitation amount, a wind speed, and a weather chart transmitted from various sensors including a precipitation amount sensor and a wind speed sensor, a satellite, and an external organization (all not illustrated). The weather prediction section 31 acquires geographic information such as topography and rivers of a designated area from the geographic information storage section 21.

The weather prediction section 31 predicts disaster information of a disaster that occurs in the future on the basis of the geographic information, the weather information, and the past disaster information stored in the past disaster information storage section 28. The weather prediction section 31 stores the predicted disaster information in the weather prediction information storage section 22.

The disaster information acquisition section 32 acquires disaster information including evacuation related information and recovery information transmitted from the local government terminal 301, and stores the disaster information in the first disaster information storage section 23. The disaster information acquisition section 32 acquires damage information transmitted from the company terminal 302 and stores the acquired damage information in the second disaster information storage section 27.

The resource management section 36 acquires resource information managed by each local government and transmitted from the local government terminal 301, and resource information managed by each company or organization and transmitted from the company terminal 302. The resource management section 36 stores the acquired resource information in the resource information storage section 24.

The disaster information comparison section 33 performs processing of comparing various types of disaster information. The disaster information comparison section 33 acquires, for example, a predicted value of the number of disaster-stricken people stored in the disaster prediction information storage section 26 and the number of people who can be accommodated in shelters stored in the first disaster information storage section, and generates images indicating the comparison result. Specifically, in a case where the number of people who can be accommodated in a certain shelter is 100 and a predicted value of the number of disaster-stricken people is 50, images indicating these numerical values by, for example, bar graphs are generated. Generated images are output to the display control section 37.

As another example, the disaster information comparison section 33 acquires the number of disaster-stricken people stored in the first disaster information storage section 23, and calculates necessary resources and the number thereof on the basis of the acquired number of people. The disaster information comparison section 33 acquires, from the resource information storage section 24, resources that can be supplied to the disaster-stricken people and the number thereof.

The disaster information comparison section 33 calculates the number of necessary resources and the number of shortages on the basis of information of each of the resources and the number thereof, and generates images of graphs indicating the calculation result. Generated images are output to the display control section 37.

The disaster prediction section 35 reads out, from the area information storage section 25, information related to an area such as day and night population and buildings in a designated area. The disaster prediction section 35 calculates predicted values of the number of disaster-stricken people and the number of disaster-stricken buildings on the basis of the latest weather prediction result stored in the weather prediction information storage section 22. The disaster prediction section 35 stores the prediction result in the disaster prediction information storage section 26.

When a typhoon occurs, the disaster prediction section 35 calculates the course and strength of the typhoon on the basis of atmospheric pressure arrangement in the sky, seawater temperature, a water vapor amount, and the like. From these calculation results, the number of disaster-stricken people and the number of disaster-stricken buildings are predicted. When a tsunami occurs, the disaster prediction section 35 calculates a height of the tsunami at the coast, an arrival time of the tsunami, an inundation area, an inundation depth distribution, and the like on the basis of a position, a scale, and the like of an earthquake that has caused the tsunami. From these calculation results, the number of disaster-stricken people and the number of disaster-stricken buildings are predicted.

The time series information generation section 34 generates disaster information images indicating a time-series change in disaster information of an area designated by a user. For example, assuming that the current time is T, a disaster information image at a time T−Δt that is a predetermined time Δt before the time T (that is, the past time), a disaster information image at the time T, and a disaster information image at a time T+Δt that is the predetermined time Δt after the time T (that is, the future time) are generated. The disaster information image at the time T+Δt can be generated from the information predicted by the disaster prediction section 35 described above.

The resource management section 36 stores resource information acquired from the client terminals including the local government terminal 301, the company terminal 302, and the like in the resource information storage section 24. The resource management section 36 outputs the resource information stored in the resource information storage section 24 to the disaster information comparison section 33.

The past information analysis section 38 reads disaster information at the time of a past disaster from the past disaster information storage section 28, and analyzes a tendency of damage and a tendency of behavior of disaster-stricken people at the time of the past disaster. On the basis of the analyzed tendencies, the past information analysis section 38 analyzes a tendency that damage expands for elapsed time from occurrence of a disaster currently occurring. For example, the number and percentage of disaster-stricken people evacuating to shelters, homes, acquaintances, relatives, temporary houses, and the like are predicted. The past information analysis section 38 outputs the analysis result to the disaster information comparison section 33.

The display control section 37 acquires maps and topographic information stored in the geographic information storage section 21, population and building information stored in the area information storage section 25, weather prediction information stored in the weather prediction information storage section 22, disaster prediction information stored in the disaster prediction information storage section 26, and disaster information stored in the first and second disaster information storage sections 23 and 27. Furthermore, the display control section 37 acquires images indicating a comparison result generated by the disaster information comparison section 33.

Figure 3:
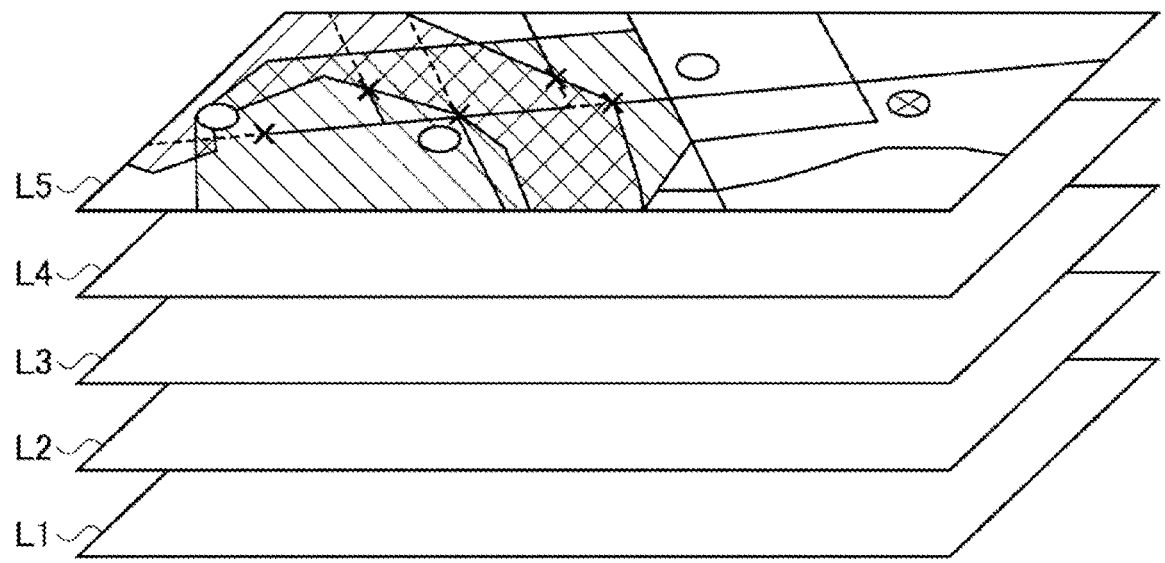
FIG. 3 is an explanatory diagram illustrating an example of a superimposed image in which images of a plurality of layers are superimposed.

The display control section 37 generates a superimposed image including a plurality of layers in which the acquired images of respective pieces of information are set as different layers. For example, as illustrated in FIG. 3, the display control section 37 generates the superimposed image including five layers L1 to L5.

For example, the layer L1 is a map image, the layer L2 is an image indicating damage situations of infrastructures, the layer L3 is an image indicating the evacuation related information, the layer L4 is an image indicating the disaster prediction information analyzed by the past information analysis section 38, and L5 is an image indicating the resource information. The display control section 37 generates the above-described superimposed image at each time. A user can select an image to be displayed on each of the layers at each time by performing a selection input using the input section 5.

The display control section 37 superimposes and displays disaster information at the past, present, and future time points on the map image in response to the selection input by the user using the input section 5. Furthermore, in a case where there is a selection input of either the current disaster information or the future disaster information from the input section 5, only images of the selected disaster information are superimposed and displayed on the map image.

Operation of Embodiment

Figure 2:
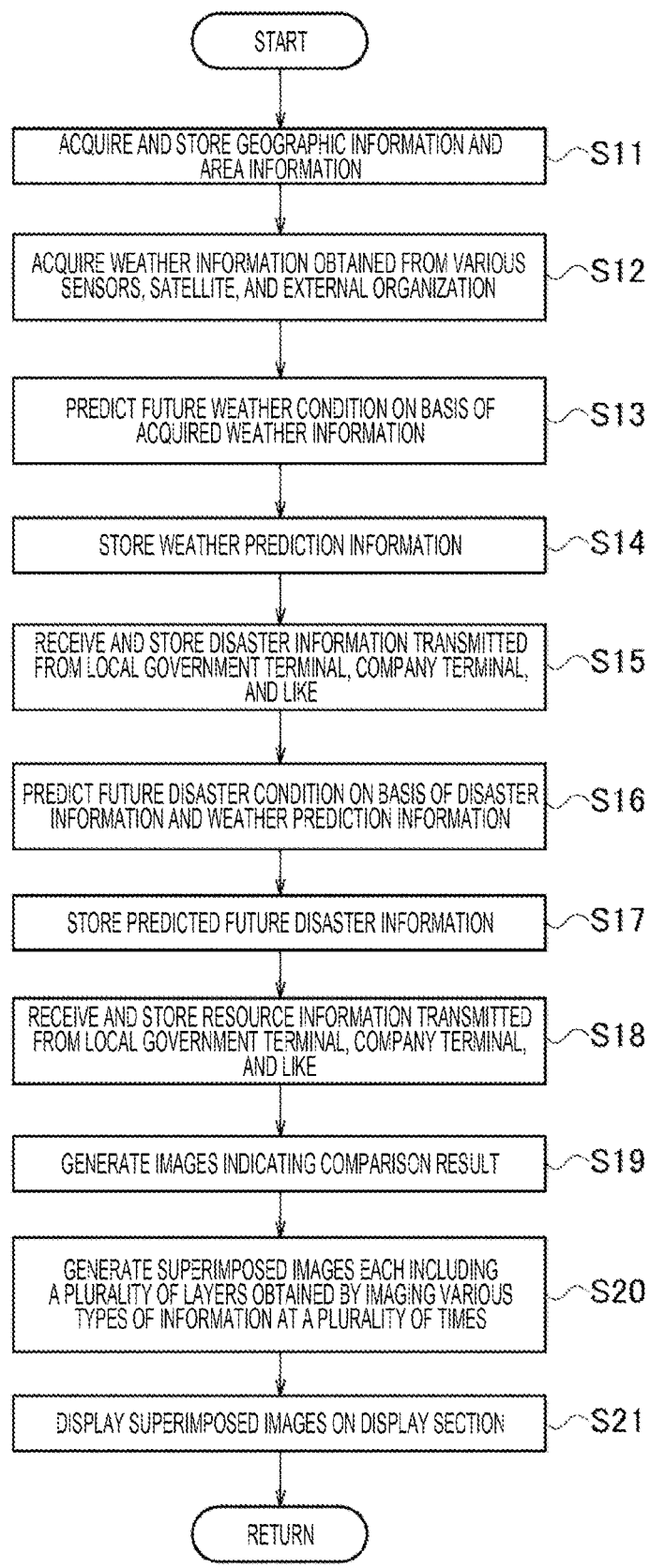
FIG. 2 is a flowchart illustrating a processing procedure of a disaster information providing device according to the embodiment.

Next, a processing procedure of the disaster information providing system 50 according to the present embodiment will be described with reference to a flowchart illustrated in FIG. 2.

First, in step S11, the communication control section 1 receives geographic information and area information provided from the information providing terminals 400. The communication control section 1 stores the received geographic information in the geographic information storage section 21 of the storage unit 2. The communication control section 1 stores the received area information in the area information storage section 25.

In step S12, the communication control section 1 receives various types of weather information transmitted from various sensors, a satellite, and an external organization via the network 200.

In step S13, the weather prediction section 31 predicts a future weather condition on the basis of the received weather information. As a result, for example, weather prediction information indicating that the precipitation amount after ∘∘ hours in the region of ∘∘ is ∘∘ mm and the like is obtained.

In step S14, the weather prediction section 31 stores the weather prediction information acquired in processing in step S13 in the weather prediction information storage section 22.

In step S15, the communication control section 1 receives disaster information transmitted from each of the client terminals 300 including the local government terminal 301 and the company terminal 302. As described above, the disaster information includes damage information, resource information, evacuation related information, and recovery information.

The communication control section 1 stores the disaster information provided by a local government and transmitted from the local government terminal 301 in the first disaster information storage section 23. The communication control section 1 stores disaster information provided by a company or an organization and transmitted from the company terminal 302, and disaster information transmitted from another client terminal 300 in the second disaster information storage section 27.

In step S16, the disaster prediction section 35 predicts future (for example, one day or two days ahead) disaster information on the basis of the disaster information transmitted from each of the client terminals 300, the weather prediction information stored in the weather prediction information storage section 22, and an analysis result by the past information analysis section 38. For example, the disaster prediction section 35 predicts the future disaster information such as information related to an area where flooding occurs, information related to road cuts, information related to the number of disaster-stricken people accommodated in shelters, information related to infrastructures, and information related to transportation facilities.

In step S17, the disaster prediction section 35 stores the predicted future disaster information in the disaster prediction information storage section 26.

In step S18, the communication control section 1 receives resource information transmitted from the local government terminal 301 and the company terminal 302. The resource management section 36 stores the resource information received in the communication control section 1 in the resource information storage section 24.

In step S19, the disaster information comparison section 33 generates images indicating a comparison result obtained by comparing various types of information. The disaster information comparison section 33 acquires, for example, a predicted value of the number of future disaster-stricken people and the number of people who can be accommodated in shelters, and generates images indicating the comparison result.

Figure 4A:
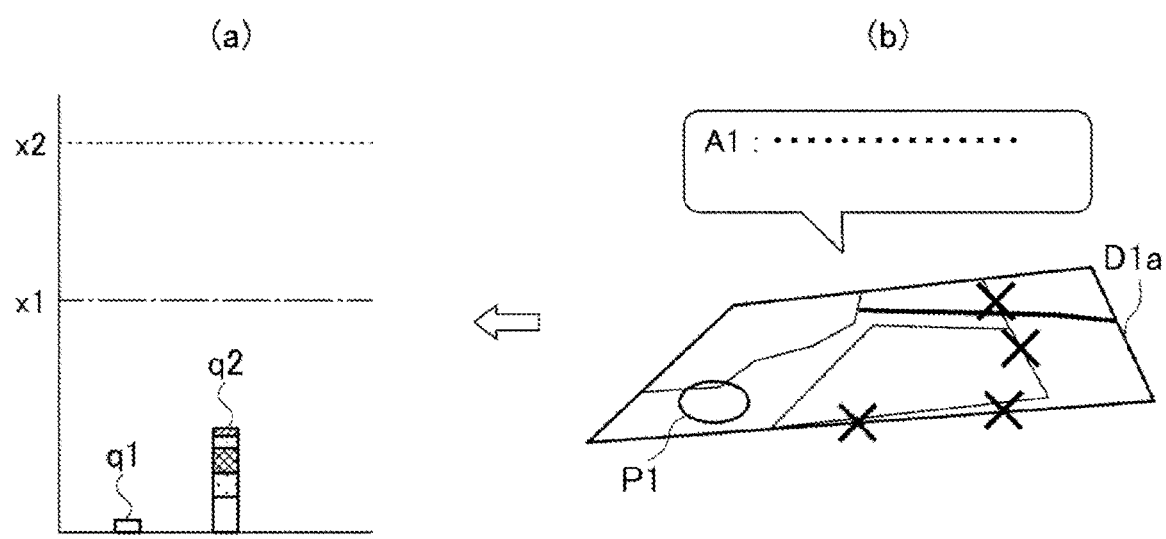
FIG. 4A is an explanatory diagram illustrating a superimposed image and the number of disaster-stricken people at a time $T-\Delta t$.
Figure 4B:
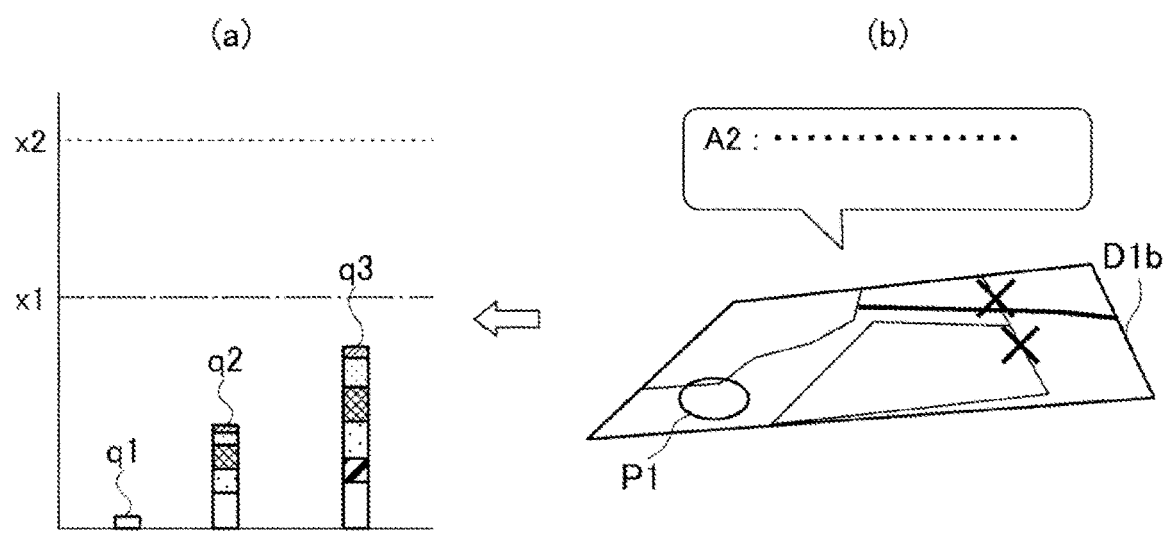
FIG. 4B is an explanatory diagram illustrating a superimposed image and the number of disaster-stricken people at a time T.
Figure 4C:
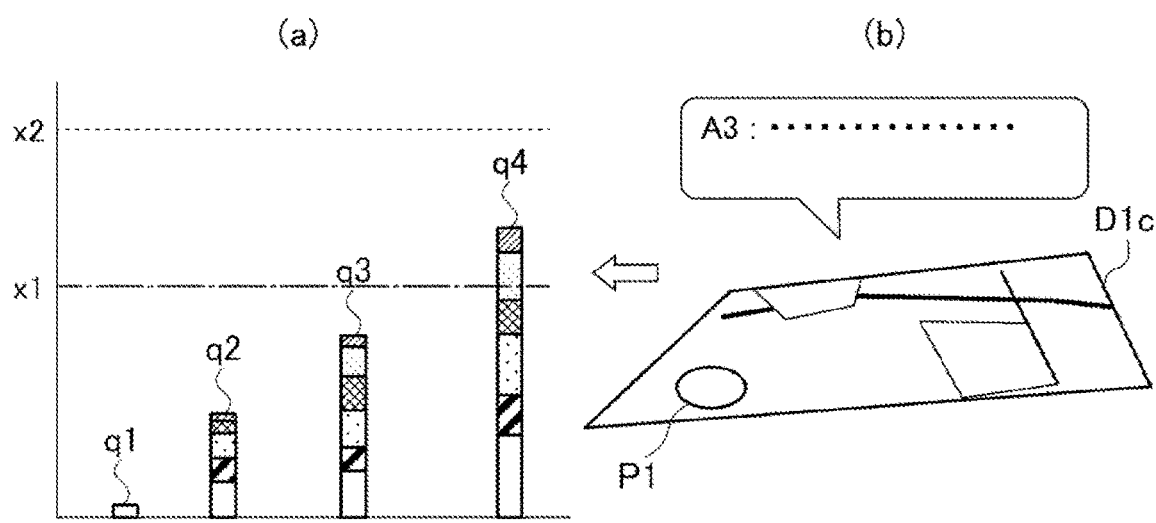
FIG. 4C is an explanatory diagram illustrating a superimposed image and the number of disaster-stricken people at a time T+Δt.

For example, as indicated in FIGS. 4A, 4B, and 4C, images of graphs indicating relationship among the numbers of disaster-stricken people q1 to q4, the number of people who can be accommodated in shelters x1, and the predicted number of disaster-stricken people x2 are generated.

FIG. 4A illustrates a superimposed image and a graph of the number of disaster-stricken people at the time $T-\Delta t$ that is the predetermined time $\Delta t$ before the current time T (that is, the past time). The number of disaster-stricken people q2 represents the number of disaster-stricken people at the time $T-\Delta t$. FIG. 4B illustrates a superimposed image and a graph of the number of disaster-stricken people at the current time T. The number of disaster-stricken people q3 represents the number of disaster-stricken people at the time T. FIG. 4C illustrates a superimposed image and a graph of the number of disaster-stricken people at the time $T+\Delta t$ that is the predetermined time $\Delta t$ after the current time T (that is, the future time). The number of disaster-stricken people q4 represents the estimated number of disaster-stricken people at the time $T+\Delta t$.

As illustrated in FIG. 5, bar graphs illustrating the numbers of disaster-stricken people q1 to q4 in FIGS. 4A, 4B, and 4C each indicate the number of disaster-stricken people evacuated in shelters, the number of disaster-stricken people who stay at home, the number of lightly injured people, the number of seriously injured people, the number of missing people, and the number of dead people.

In step S20, the display control section 37 generates superimposed images each including a plurality of layers obtained by imaging various types of information at times "T−Δt", "T", and "T+Δt".

For example at the current time T, a superimposed image including five layers L1 to L5 is generated as illustrated in FIG. 3. As described above, the layer L1 is a map image, the layer L2 is an image indicating damage situations of infrastructures, the layer L3 is an image indicating the evacuation related information, the layer L4 is an image indicating the disaster prediction information analyzed by the past information analysis section 38, and L5 is an image indicating the resource information. The display control section 37 generates the above-described superimposed image at each of the times "T−Δt", "T", and "T+Δt".

In step S21, the display control section 37 displays the superimposed images generated by processing in step S20 on the display section 4. Specifically, the display control section 37 generates the superimposed images at the times "T−Δt", "T", and "T+Δt", and displays the superimposed images on the display section 4 simultaneously or alternatively. Therefore, a user can view the superimposed images indicating the disaster information at the times. Furthermore, by the superimposed images at the times "T−Δt", "T", and "T+Δt" being viewed, a time-series change in the disaster information can be recognized.

As illustrated in FIGS. 4A(b), 4B (b), and 4C (b), when a user selects superimposed images D1a, D1b, and D1c on the screen using a mouse or the like, the outline of disaster information at that time is displayed by a balloon. For example, information such as "arranging a simple toilet and a water supply vehicle, arranging a power generator due to a power failure, and reviewing a delivery route due to closing of a road" is displayed in a balloon A1 illustrated in FIG. 4A(b). In a balloon A2 illustrated in FIG. 4B (b), information such as "taking up the simple toilet due to elimination of water outage, continuing the power generator, and reviewing the delivery route due to elimination of closing of the road" is displayed. In a balloon A3 illustrated in FIG. 4C (b), information such as "continuing food replenishment arrangement, planning a water supply vehicle take up plan by elimination of the water outage, planning a generator take up plan, and reviewing the delivery route by elimination of closing of the road" is displayed. A user can recognize the outline of the disaster information at that time by viewing this balloon.

Furthermore, when the position of a location of a shelter displayed in each of the superimposed images D1a, D1b, and D1c is selected using a mouse or the like, graphs indicating the number of people who can be accommodated in the shelter, the predicted number of disaster-stricken people, and disaster-stricken people in an area to be controlled by the shelter are displayed as illustrated in FIGS. 4A(a), 4B(a), and 4C(a).

A user can recognize the allowable number of people, the required number of supplies, and the like in any shelter by viewing this graph.

Furthermore, there is a high possibility that disaster-stricken people who may come to shelters in the future are "people at home" or "people in hospitals (lightly injured people)". For this reason, the total number of the number of the disaster-stricken people at home and the number of the disaster-stricken people at hospitals is compared with the number of people who can be accommodated in the shelters, and in a case where it is assumed that the number of people who can be accommodated in the shelters is insufficient, arrangement for opening a new shelter is planned in advance.

Furthermore, the percentages of people in shelters and people at home can be recognized by the tendency of evacuation spots at the time of a disaster in the past being analyzed. Since a user can grasp the tendencies in the past and at the time of reporting using numerical values described in balloons, work to be performed in the future can be extracted.

For example, if the percentage of people at home is low at the time of reporting, there is a possibility of delay in existence confirmation, and at the same time, there is a possibility that the amount of food and drinking water to be distributed to disaster-stricken people is to be insufficient, and thus the progress status of the existence confirmation work is confirmed, and the next operation plan is made on the basis of the confirmation result.

Further, when a position P1 of a shelter displayed in each of the superimposed images D1a, D1b, and D1c is selected, resource information in the shelter is displayed as illustrated in FIGS. 6A, 6B, and 6C. For example, the required number of tents, the number of stockpiles, and the total number required after two days are displayed. Using this resource information, a user can recognize necessary resources and the number of the resources in time series, and can consider a response ahead of time such as which resources are to be insufficient in the future.

Effects of Embodiment

As described above, the disaster information providing device 100 according to the present embodiment includes the past disaster information storage section 28 that stores disaster information related to a disaster that has occurred in the past, the disaster information acquisition section 32 that acquires current disaster information related to a disaster that has occurred this time, the disaster prediction section 35 that predicts future disaster information caused by a disaster that has occurred this time on the basis of current disaster information acquired by the disaster information acquisition section 32 and past disaster information stored in the past disaster information storage section 28, and the display control section 37 that displays an image in which the current disaster information and the future disaster information are superimposed.

In the present embodiment, when a disaster such as a typhoon or a large earthquake occurs, an image in which disaster information generated by the disaster and future disaster information predicted from past disaster information are superimposed is generated and displayed on the display section 4.

Therefore, since a user can visually recognize the future disaster information, the user can easily recognize resource information and the like required in the future, and can quickly arrange resources. Furthermore, planning of recovery operation can be supported.

In the present embodiment, disaster information that occurs in the future can be more accurately predicted by a damage situation of a disaster that has occurred in the past and information unique to the area, such as a fault, stored in the geographic information storage section 21 being combined on the basis of information at a certain point of time to simulate a damage situation.

In the present embodiment, by operation information and disconnection information of transportation facilities such as railways and roads being displayed in evacuation related information, residents can be accurately notified of route information for facilities such as shelters and hospitals, and the residents can safely go to the facilities.

In the present embodiment, by superimposed images from the past to the future being displayed on the display section 4, a user can recognize a time-series change in the disaster information. Therefore, resource allocation plans of shelters and hospitals and transportation routes of supplies can be determined by situations of the shelters and the hospitals, and information related to infrastructures including electricity, gas, water supply, and communication networks at any time in a time zone from the past to the future being linked, and accordingly recovery operation can be efficiently proceeded.

In the present embodiment, a user can freely set layers of superimposed images to be displayed on the display section 4. For example, in a case where situations of the infrastructures are to be confirmed, an image in which the situations of the infrastructures are displayed on a map image can be displayed by the layer L1 of the map image and the layer L2 of the image indicating the situations of the infrastructures illustrated in FIG. 3 being selected. Therefore, disaster information to be confirmed can be selected and displayed by a simple operation.

Furthermore, as illustrated in FIGS. 4A, 4B, and 4C, when any shelter on a time-series superimposed image is designated, disaster information in the shelter at that time is displayed on a map. Specifically, the breakdown of evacuees is displayed as a bar graph as illustrated in FIGS. 4A(a), 4B(a), and 4C(a). Further, resource information at that time is displayed as illustrated in FIGS. 6A, 6B, and 6C. Therefore, a plan for a disaster can be made in advance.

Description of First Modification

Figure 7:
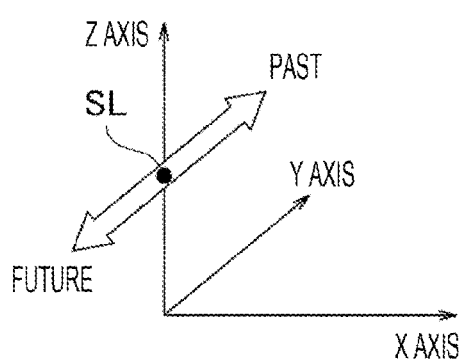
FIG. 7 is an explanatory diagram illustrating an image for selecting images from the past to the future according to a first modification.

Next, a first modification of the above-described embodiment will be described. In the first modification, as illustrated in FIG. 7, three-dimensional orthogonal coordinates of X, Y, and Z are displayed on the display section 4, and the Y-axis direction is set as a time axis. When a user moves a slider SL along the Y-axis direction, the superimposed images at the times from the past to the future can be switched and displayed as illustrated in FIGS. 4A, 4B, and 4C.

As described above, in the first modification, the superimposed images at the times of the past, the present, and the future can be displayed by a simple operation in which a user performs dragging using a mouse, and operability and visibility can be improved.

Description of Second Modification

Figure 8:
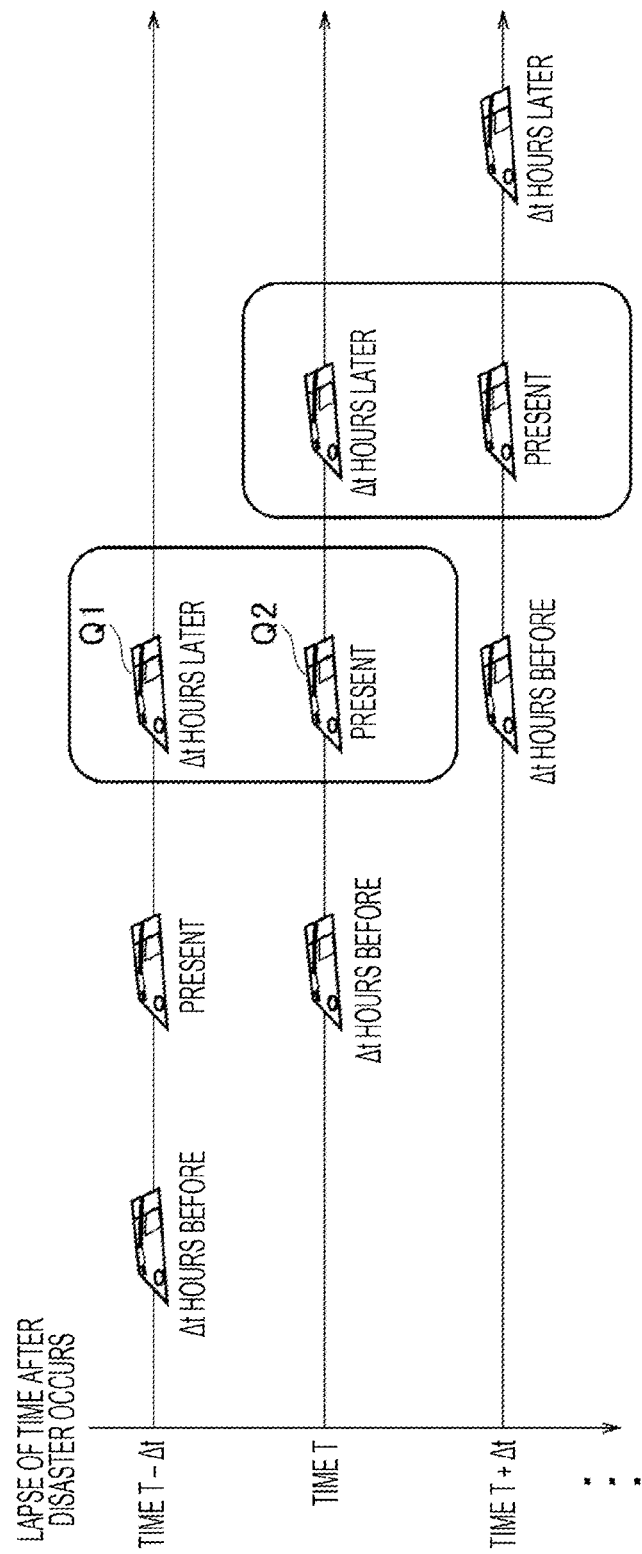
FIG. 8 is an explanatory diagram illustrating a display example of superimposed images according to a second modification.

Next, a second modification of the above-described embodiment will be described. FIG. 8 is a diagram illustrating a display example of the superimposed images according to the second modification.

As illustrated in FIG. 8, in the second modification, a superimposed image at a time point of the current time T, a superimposed image at a time point of the time T−Δt that is the predetermined time Δt before the time T, and a superimposed image at a time point of the time T+Δt that is the predetermined time Δt after the time T are displayed. Further, every time the predetermined time Δt elapses, the superimposed images at the times are updated and displayed.

Therefore, a future superimposed image displayed at the time T−Δt can be easily compared with a current superimposed image displayed at the time T. Specifically, an image indicated by reference numeral Q1 can be compared with an image indicated by reference numeral Q2 in FIG. 8.

Therefore, a difference between predicted disaster information at the time T−Δt and disaster information when the predetermined time Δt has actually elapsed can be confirmed, and in a case where the difference is large, a user can be prompted to change a policy such as reviewing a plan of a disaster countermeasure.

Figure 9:
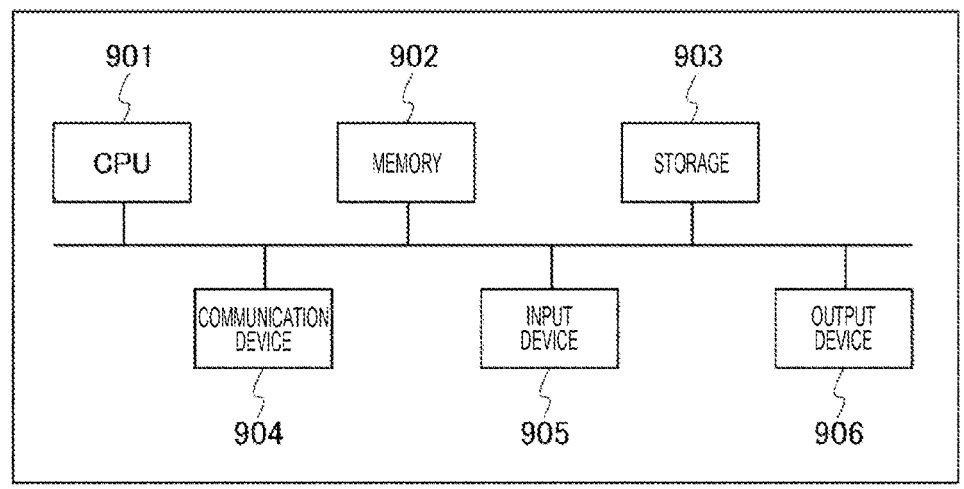
FIG. 9 is a block diagram illustrating a hardware configuration of the present embodiment.

As illustrated in FIG. 9, for example, a general-purpose computer system including a central processing unit (CPU, processor) 901, a memory 902, a storage 903 (hard disk drive: HDD, solid state drive: SSD), a communication device 904, an input device 905, and an output device 906 can be used for the disaster information providing device 100 of the present embodiment described above. The memory 902 and the storage 903 are storage devices. In the computer system, each function of the disaster information providing device 100 is implemented by the CPU 901 executing a predetermined program loaded on the memory 902.

The disaster information providing device 100 may be implemented by one computer or may be implemented by a plurality of computers. In addition, the disaster information providing device 100 may be a virtual machine that is implemented in a computer.

A program for the disaster information providing device 100 can be stored in a computer-readable recording medium such as an HDD, SSD, universal serial bus (USB) memory, compact disc (CD), or digital versatile disc (DVD) or can be distributed via a network.

The present invention is not limited to the above embodiment, and various modifications can be made within the scope of the spirit of the present invention.

REFERENCE SIGNS LIST

1 Communication control section
2 Storage unit
3 Control unit
4 Display section
5 Input section
21 Geographic information storage section
22 Weather prediction information storage section
23 First disaster information storage section
24 Resource information storage section
25 Area information storage section
26 Disaster prediction information storage section
27 Second disaster information storage section
28 Past disaster information storage section
31 Weather prediction section
32 Disaster information acquisition section
33 Disaster information comparison section
34 Time series information generation section
35 Disaster prediction section
36 Resource management section
37 Display control section
38 Past information analysis section
50 Disaster information providing system
100 Disaster information providing device
200 Network
300 Client terminal
301 Local government terminal
302 Company terminal
400 Information providing terminal

The invention claimed is:

1. A disaster information providing device comprising:
a past disaster information storage section, including one or more processors, configured to store disaster information related to a disaster that has occurred in a past;
a disaster information acquisition section, including one or more processors, configured to acquire current disaster information related to a disaster that has occurred at a time;
a disaster prediction section, including one or more processors, configured to predict future disaster information caused by a disaster that has occurred this time on a basis of the acquired current disaster information and the stored past disaster information; and
a display control section, including one or more processors, configured to:
generate, for each of a past time, a current time, and a future time, a respective image superimposed on a map image, each respective image comprising a plurality of layers that represent disaster information for a respective time;
display each generated respective image.

2. The disaster information providing device according to claim 1, wherein the display control section is configured to superimpose and display the acquired current disaster information and the predicted future disaster information on the map image of an area where a disaster has occurred.

3. The disaster information providing device according to claim 2, further comprising an input section that receives an external input,
wherein, when any one of the acquired current disaster information and the predicted future disaster information is selected and input from the input section, the display control section is configured to superimpose and display only selected disaster information on the map image.

4. The disaster information providing device according to claim 1, wherein the disaster information includes at least one of damage information indicating a situation of damage, resource information indicating a supply amount and a shortage amount of a supply, evacuation related information, or recovery information of damage.

5. A disaster information providing system comprising:
a disaster information providing device; and
a client terminal connected to the disaster information providing device via a network,
wherein the disaster information providing device includes:
a past disaster information storage section, including one or more processors, configured to store disaster information related to a disaster that has occurred in a past;
a disaster information acquisition section, including one or more processors, configured to acquire current disaster information related to a disaster that has occurred this time;
a disaster prediction section, including one or more processors, configured to predict future disaster information caused by a disaster that has occurred this time on a basis of the acquired current disaster information and the stored past disaster information; and
a display control section, including one or more processors, configured to:
generate, for each of a past time, a current time, and a future time, a respective image superimposed on a map image, each respective image comprising a plurality of layers that represent disaster information for a respective time;
display each generated respective image.

6. A disaster information providing method comprising:
storing disaster information related to a disaster that has occurred in a past;
acquiring current disaster information related to a disaster that has occurred this time;
predicting future disaster information caused by a disaster that has occurred this time on a basis of the acquired current disaster information and the stored past disaster information;
generating, for each of a past time, a current time, and a future time, a respective image superimposed on a map image, each respective image comprising a plurality of layers that represent disaster information for a respective time; and
displaying each generated respective image an image.

7. A disaster information providing program causing a computer to function as the disaster information providing device according to any one of claim 1.

8. The disaster information providing device according to claim 1, wherein each respective image that comprises the plurality of layers that represent disaster information for a respective time comprises:
a past image that comprises a plurality of layers that represent past disaster information for the past time,
a current image that comprises a plurality of layers that represent the acquired current disaster information for the current time, and
a future image that comprises a plurality of layers that represent the predicted future disaster information for the future time.

9. The disaster information providing device according to claim 1, wherein the display control section is further configured to display the generated images to enable a user to view a time series change of disaster information.

* * * * *